(12) United States Patent
Shi et al.

(10) Patent No.: US 11,551,367 B2
(45) Date of Patent: *Jan. 10, 2023

(54) ULTRAFAST, ROBUST AND EFFICIENT DEPTH ESTIMATION FOR STRUCTURED-LIGHT BASED 3D CAMERA SYSTEM

(71) Applicant: Samsung Electronics Co., Ltd., Suwon-si (KR)

(72) Inventors: Lilong Shi, Pasadena, CA (US); Seunghoon Han, Seoul (KR)

(73) Assignee: SAMSUNG ELECTRONICS CO., LTD.

(*) Notice: Subject to any disclaimer, the term of this patent is extended or adjusted under 35 U.S.C. 154(b) by 33 days.

This patent is subject to a terminal disclaimer.

(21) Appl. No.: 16/851,093

(22) Filed: Apr. 16, 2020

(65) Prior Publication Data

US 2020/0242789 A1 Jul. 30, 2020

Related U.S. Application Data

(63) Continuation of application No. 15/907,242, filed on Feb. 27, 2018, now Pat. No. 10,740,913.

(Continued)

(51) Int. Cl.
*G06T 7/521* (2017.01)
*G01B 11/25* (2006.01)
(Continued)

(52) U.S. Cl.
CPC .......... *G06T 7/521* (2017.01); *G01B 11/2513* (2013.01); *G06V 10/751* (2022.01);
(Continued)

(58) Field of Classification Search
CPC .......... G06T 7/521; G06T 2207/10028; G01B 11/2513; G06K 9/6202; H04N 13/254;
(Continued)

(56) References Cited

U.S. PATENT DOCUMENTS 5,867,250 A 2/1999 Baron
5,986,745 A 11/1999 Hermary et al.
(Continued)

FOREIGN PATENT DOCUMENTS

TW I604414 B 11/2017

OTHER PUBLICATIONS

Notice of Allowance for U.S. Appl. No. 16/003,014, dated May 5, 2021.

(Continued)

*Primary Examiner* — John W Lee
(74) *Attorney, Agent, or Firm* — Renaissance IP Law Group LLP

(57) ABSTRACT

A system and a method are disclosed for a structured-light system to estimate depth in an image. An image is received in which the image is of a scene onto which a reference light pattern has been projected. The projection of the reference light pattern includes a predetermined number of particular sub-patterns. A patch of the received image and a sub-pattern of the reference light pattern are matched based on either a hardcode template matching technique or a probability that the patch corresponds to the sub-pattern. If a lookup table is used, the table may be a probability matrix, may contain precomputed correlations scores or may contain precomputed class IDs. An estimate of depth of the patch is determined based on a disparity between the patch and the sub-pattern.

6 Claims, 10 Drawing Sheets

Related U.S. Application Data

(60) Provisional application No. 62/597,904, filed on Dec. 12, 2017.

(51) Int. Cl.
    *G06V 10/75*     (2022.01)
    *H04N 13/254*     (2018.01)
    *H04N 13/271*     (2018.01)
    *H04N 13/207*     (2018.01)
    *H04N 13/00*     (2018.01)

(52) U.S. Cl.
CPC ......... *H04N 13/254* (2018.05); *H04N 13/271* (2018.05); *G06T 2207/10028* (2013.01); *H04N 13/207* (2018.05); *H04N 2013/0081* (2013.01)

(58) Field of Classification Search
CPC ............... H04N 13/271; H04N 13/207; H04N 2013/0081
See application file for complete search history.

(56) References Cited

U.S. PATENT DOCUMENTS

| | | | |
|---|---|---|---|
| 6,229,913 B1* | 5/2001 | Nayar | G06V 20/66 250/201.4 |
| 6,549,288 B1 | 4/2003 | Migdal et al. | |
| 7,448,009 B2 | 11/2008 | Pundoor | |
| 7,496,867 B2 | 2/2009 | Turner et al. | |
| 7,684,052 B2 | 3/2010 | Suwa et al. | |
| 7,751,063 B2 | 7/2010 | Dillon et al. | |
| 7,849,422 B2 | 12/2010 | Sferrazza | |
| 7,930,674 B2 | 4/2011 | Parker et al. | |
| 8,502,979 B2 | 8/2013 | Levy et al. | |
| 8,538,166 B2 | 9/2013 | Gordon et al. | |
| 8,717,676 B2 | 5/2014 | Rinko | |
| 9,046,355 B2 | 6/2015 | Takabayashi et al. | |
| 9,122,946 B2 | 9/2015 | Zhang et al. | |
| 9,277,866 B2 | 3/2016 | Cuccia | |
| 9,501,833 B2 | 11/2016 | Gordon et al. | |
| 9,599,558 B2 | 3/2017 | Westphal et al. | |
| 9,635,339 B2 | 4/2017 | Campbell et al. | |
| 9,712,806 B2 | 7/2017 | Olmstead | |
| 9,769,454 B2 | 9/2017 | Visentini et al. | |
| 9,892,501 B2 | 2/2018 | Dehais et al. | |
| 2006/0126958 A1* | 6/2006 | Kang | G06V 10/28 358/3.03 |
| 2007/0177160 A1 | 8/2007 | Sasaki | |
| 2008/0037044 A1* | 2/2008 | Tse | H04N 1/409 358/1.9 |
| 2012/0154607 A1 | 6/2012 | Moed et al. | |
| 2013/0300637 A1 | 11/2013 | Smits et al. | |
| 2014/0120319 A1 | 5/2014 | Joseph | |
| 2015/0138078 A1 | 5/2015 | Krupka et al. | |
| 2015/0341619 A1 | 11/2015 | Meir et al. | |
| 2015/0371394 A1* | 12/2015 | Visentini | H04N 13/161 382/154 |
| 2016/0163031 A1 | 6/2016 | Gordon et al. | |
| 2016/0286202 A1 | 9/2016 | Romano et al. | |
| 2016/0335778 A1 | 11/2016 | Smits | |
| 2017/0172382 A1 | 6/2017 | Nir et al. | |
| 2017/0199029 A1 | 7/2017 | Raz | |
| 2018/0101962 A1* | 4/2018 | Takizawa | H04N 9/3185 |
| 2018/0210313 A1 | 7/2018 | Weaver | |

OTHER PUBLICATIONS

Office Action for U.S. Appl. No. 15/928,081, dated May 27, 2021.
Final Office Action for U.S. Appl. No. 15/928,081, dated Feb. 5, 2021.
Office Action for U.S. Appl. No. 16/003,014, dated Dec. 10, 2020.
Final Office Action for U.S. Appl. No. 15/928,081, dated Jun. 17, 2020.
Final Office Action for U.S. Appl. No. 16/003,014, dated Jul. 10, 2020.
Office Action for U.S. Appl. No. 15/928,081, dated Sep. 18, 2020.
Corrected Notice of Allowability for U.S. Appl. No. 16/003,014, dated Oct. 26, 2021.
Notice of Allowance for U.S. Appl. No. 15/928,081, dated Nov. 23, 2021.
Corrected Notice of Allowance for U.S. Appl. No. 16/003,014, dated Sep. 23, 2021.
Final Office Action for U.S. Appl. No. 15/928,081, dated Sep. 16, 2021.
Geng, Jason, "Structured-light 3D surface imaging: a tutorial", Advances in Optics and Photonics 3, 128-160 (2011), IEEE Intelligent Transportation System Society, Rockville Maryland 20852, USA.
Notice of Allowance for U.S. Appl. No. 15/907,242, dated Mar. 25, 2020.
Office Action for U.S. Appl. No. 15/907,242, dated Dec. 13, 2019.
Office Action for U.S. Appl. No. 15/928,081, dated Jan. 30, 2020.
Office Action for U.S. Appl. No. 16/003,014, dated Feb. 26, 2020.
Corrected Notice of Allowability for U.S. Appl. No. 15/928,081, dated Dec. 27, 2021.
Corrected Notice of Allowability for U.S. Appl. No. 16/003,014, dated Dec. 9, 2021.
Notice of Allowance for U.S. Appl. No. 17/374,982, dated Aug. 10, 2022.

* cited by examiner

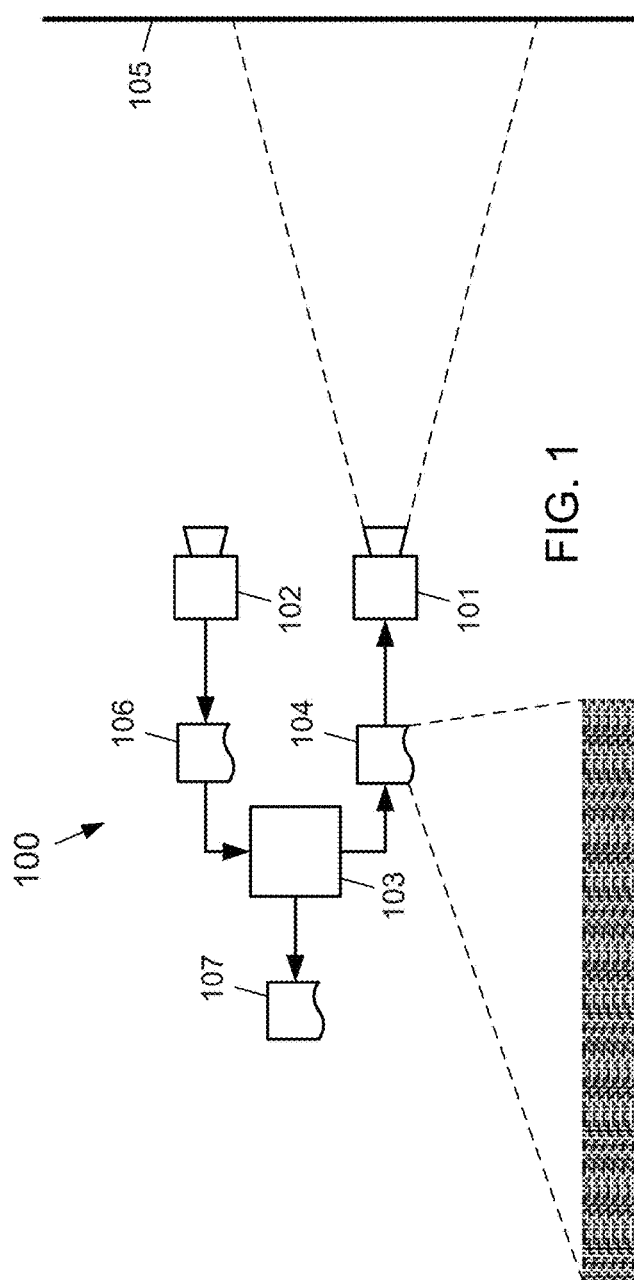
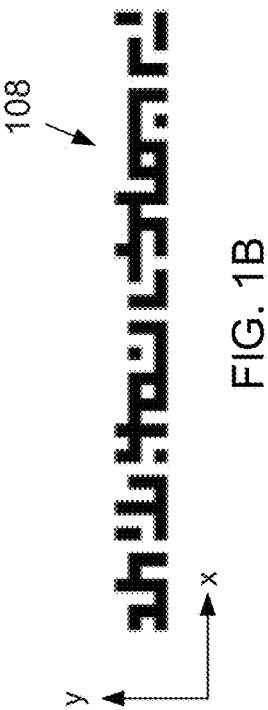
FIG. 1
FIG. 1A
FIG. 1B

ULTRAFAST, ROBUST AND EFFICIENT DEPTH ESTIMATION FOR STRUCTURED-LIGHT BASED 3D CAMERA SYSTEM

CROSS-REFERENCE TO RELATED APPLICATION

This patent application is a continuation of Ser. No. 15/907,242, filed on Feb. 27, 2018, which claims the priority benefit under 35 U.S.C. § 119(e) of U.S. Provisional Patent Application No. 62/597,904, filed on Dec. 12, 2017, the disclosures of which are incorporated herein by reference in their entirety.

TECHNICAL FIELD

The subject matter disclosed herein generally relates to an apparatus and a method for structured-light systems and, more particularly, to an apparatus and a method for matching patches of an image to patches of a reference light pattern.

BACKGROUND

A widely used technique for estimating depth values in structured-light three-dimensional (3D) camera systems, also referred to as stereo-camera systems, is by searching for the best match of a patch in the image to a patch in a reference pattern. To reduce the overall computational burden of such a search, the image patch is assumed to be in a near horizontal neighborhood of the reference pattern. Also, the reference pattern is designed so that there is only a finite set of unique sub-patterns, which are repeated horizontally and vertically to fill in the entire projection space, which further simplifies the search process. The known arrangement of the unique patterns in the reference pattern is used to identify the "class" of an image patch and, in turn, determine the disparity between the image patch and the reference patch. The image patch is also assumed to be centered at a depth pixel location, which also simplifies the calculation of the depth estimation.

Nevertheless, if the image patch size and the searching range become large, patch searching becomes time consuming and computationally intensive, thereby making real time depth estimation difficult to achieve. In addition to suffering from significant computational costs, some structured-light 3D-camera systems may also suffer from significant noise in depth estimation. As a consequence, such structured-light 3D-camera systems have high power consumption, and may be sensitive to image flaws, such as pixel noise, blur, distortion and saturation.

SUMMARY

An example embodiment provides a method for a structured-light system to estimate depth in an image that may include: receiving the image in which the image may be of a scene onto which a reference light pattern has been projected, in which the image may include a projection of the reference light pattern, and in which the reference light pattern may include a predetermined number of particular sub-patterns; matching a patch of the image and a sub-pattern of the reference light pattern based on a probability that the patch corresponds to the sub-pattern; and determining an estimate of depth of the patch based on a disparity between the patch and the sub-pattern. In one embodiment, the probability may be contained in a lookup table that may include a probability matrix, and the patch may include a predetermined number of pixels, and wherein matching the patch and the sub-pattern further may include: binarizing the pixels forming the patch; forming a vector from the pixels; and determining a class of the patch by multiplying the vector of the pixels by the probability matrix in which the class may correspond to the sub-pattern matching the patch.

Another example embodiment provides a method for a structured-light system to estimate depth in an image that may include: receiving the image in which the image may be of a scene onto which a reference light pattern has been projected, in which the image may include a projection of the reference light pattern, and in which the reference light pattern may include a predetermined number of particular sub-patterns; binarizing at least one patch of the image in which the patch may include a predetermined number of pixels; matching the at least one patch to a sub-pattern of the reference light pattern by minimizing an error function $E_k$ for the patch based on a first number of ones in the binarized patch and a second number of ones in each respective binarized sub-pattern; and determining an estimate of depth for at least one patch of the image based on a disparity between the patch and the sub-pattern. In one embodiment, the second number of ones in each respective binarized sub-pattern may be determined by incrementing the second number of ones for a first binarized sub-pattern by 2 to obtain the second number of ones for a subsequent binarized sub-pattern.

Still another example embodiment provides a method for a structured-light system to estimate depth in an image that may include: receiving the image in which the image may be of a scene onto which a reference light pattern has been projected, in which the image may include a projection of the reference light pattern, and in which the reference light pattern may include a predetermined number of particular sub-patterns; binarizing at least one patch of the image; matching the binarized patch and a sub-pattern of the reference light pattern based on a probability that the binarized patch corresponds to the sub-pattern; and determining an estimate of depth of the at least one patch based on a disparity between the patch and the sub-pattern. In one embodiment, the probability that the binarized patch corresponds to the sub-pattern may be contained in a lookup table. The lookup table may include a probability matrix, and the patch may include a predetermined number of pixels. Matching of the binarized patch and the sub-pattern may further include forming a vector from the binarized patch, and determining a class of the patch by multiplying the vector of the binarized patch by the probability matrix in which the class may correspond to the sub-pattern matching the patch.

BRIEF DESCRIPTION OF THE DRAWINGS

In the following section, the aspects of the subject matter disclosed herein will be described with reference to exemplary embodiments illustrated in the figures, in which:

FIG. 1 depicts a block diagram of an example embodiment of a structured-light system according to the subject matter disclosed herein;

FIG. 1A depicts an example embodiment of the reference light pattern according to the subject matter disclosed herein;

FIG. 1B depicts an example embodiment of a reference light-pattern element that may be used to form the reference light pattern of FIG. 1A;

DETAILED DESCRIPTION

Figure 2A:
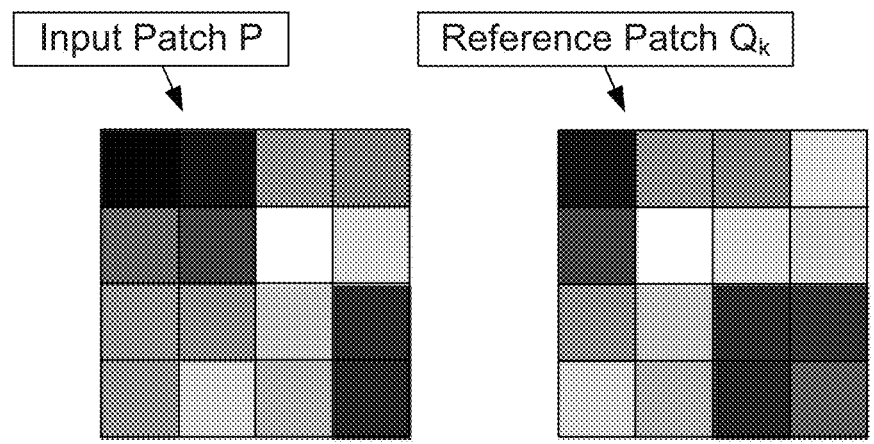
FIG. 2A depicts left and right image input patches that are to be matched using a hardcode template matching technique.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments disclosed herein provide rapid depth estimations for a structured-light system. In one embodiment, depth estimations are provided based on hardcode template matching of image patches to reference patches. In another embodiment, image patches are matched to reference patches by correlation based on, for example, Bayes' rule. Still another embodiment matches image patches to reference patches using a lookup table to provide extremely fast depth estimation. All of the embodiments disclosed herein provide a dramatically reduced computational burden and reduced memory/hardware resource demands in comparison to other approaches, while also reducing noise, blur and distortion that may accompany the other approaches.

Embodiments disclosed herein that use a lookup table provide a constant-time depth estimation. Moreover, the lookup table may be learned based on a training dataset that enhances depth prediction. The lookup table may be more robust than other approaches, while also achieving high accuracy.

FIG. 1 depicts a block diagram of an example embodiment of a structured-light system 100 according to the subject matter disclosed herein. The structured-light system 100 includes a projector 101, a camera 102 and a processing device 103. The processing device 103 sends a reference light pattern 104 to the projector 101, and the projector 101 projects the reference light pattern 104 onto a scene or object that is represented by a line 105. The camera 102 captures the scene with the projected reference light pattern 104 as an image 106. The image 106 is transmitted to the processing device 103, and the processing device generates a depth map 107 based on a disparity of the reference light pattern as captured in the image 106 with respect to the reference light pattern 104. The depth map 107 includes estimated depth information corresponding to patches of the image 106.

The processing device 103 may be a microprocessor or a personal computer programed via software instructions, a dedicated integrated circuit or a combination of both. In one embodiment, the processing provided by processing device 103 may be implemented completely via software, via software accelerated by a graphics processing unit (GPU), a multicore system or by a dedicated hardware, which is able to implement the processing operations. Both hardware and software configurations may provide different stages of parallelism. One implementation of the structured-light system 100 may be part of a handheld device, such as, but not limited to, a smartphone, a cellphone or a digital camera.

In one embodiment, the projector 101 and the camera 102 may be matched in the visible region or in the infrared light spectrum, which may not visible to human eyes. The projected reference light pattern may be within the spectrum range of both the projector 101 and the camera 102. Additionally, the resolutions of the projector 101 and the camera 102 may be different. For example, the projector 101 may project the reference light pattern 104 in a video graphics array (VGA) resolution (e.g., 640×480 pixels), and the camera 102 may have a resolution that is higher (e.g., 1280×720 pixels). In such a configuration, the image 106 may be down-sampled and/or only the area illuminated by the projector 101 may be analyzed in order to generate the depth map 107.

FIG. 1A depicts an example embodiment of the reference light pattern 104 according to the subject matter disclosed herein. In one embodiment, the reference light pattern 104 may include a plurality of reference light-pattern elements that may be repeated in both horizontal and vertical direction to completely fill the reference light pattern 104.

FIG. 1B depicts an example embodiment of a reference light-pattern element 108 that is 48 dots wide in a horizontal direction (i.e., the x direction), and four pixels high in a vertical direction (i.e., the y direction). For simplicity, the ratio of dots to pixels may be 1:1, that is, each projected dot may be captured by exactly one pixel in a camera. If a 4×4 pixel window is superimposed on the reference light-pattern element 108 and slid horizontally (with wrapping at the edges), there will be 48 unique patterns. If the 4×4 pixel window is slid vertically up or down over the four pixels of the height of the element 108 (with wrapping) while the 4×4 pixel window is slid horizontally, there will be a total of 192 unique patterns. In one embodiment, the reference light pattern 104 of FIG. 1A may be formed by repeating the reference light-pattern element 108 ten times in the horizontal direction and 160 times in the vertical direction.

In one embodiment disclosed herein, the processing device 103 may generate the estimated depth information for the depth map 107 by using a hardcode template matching technique to match image patches to patches of the reference light pattern 104, in which the complexity of the matching technique is O(P) and P is the size of the patch being matched. In another embodiment disclosed herein, the processing device 103 may generate the estimated depth information by matching image patches to patches of the reference light pattern 104 based on a probability that an image patch matches a patch of the reference light pattern 104, in which the complexity of the matching technique is O(P). In still another embodiment disclosed herein, the processing device 103 may generate the estimated depth information by referring to a lookup table (LUT) that may contain probability information that an image patch matches a patch of the reference light pattern 104, in which the complexity of the matching technique may be represented by O(1).

1. Hardcode Template Matching.

Matching an image patch to a patch of the reference light pattern 104 may be performed by direct calculation using a hardcode template matching technique according to the subject matter disclosed herein. For computational purposes, the reference light pattern 104 may be represented by patterns of 1s and 0s, which greatly simplifies the computations for the patch comparisons.

One of three different computational techniques may be used for matching an image patch to a patch of the reference light pattern. A first computational technique may be based on a Sum of Absolute Difference (SAD) approach in which a matching score is determined based on the sum of the pixel-wise absolute difference between an image patch and a reference patch. A second computational technique may be based on a Sum of Squared Difference (SSD) approach. A third computational technique may be based on a Normalized Cross-Correlation (NCC) approach.

Figure 2B:
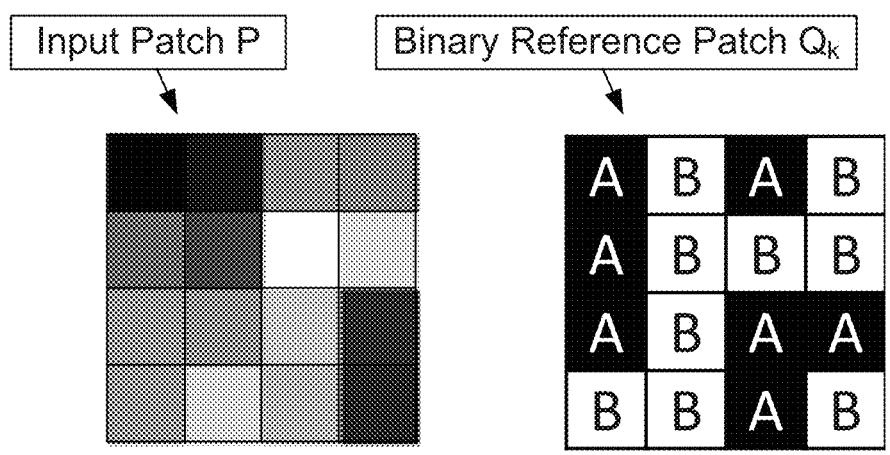
FIG. 2B depicts an image input patch and a reference light pattern patch that are to be matched using a hardcode template matching technique according to the subject matter disclosed herein.

To illustrate the advantages of the different direct-calculation approaches provided by the embodiments disclosed herein, FIGS. 2A and 2B will be referred to compare other direct-calculation approaches to the direct-calculation approaches according to the subject matter disclosed herein for matching image patches to reference patches.

FIG. 2A depicts two 4×4 image patches that may be received in a typical stereo-camera system. The left-most image input patch P is to be matched to a right-most image reference patch Q. Consider that a reference light pattern, such as the reference light pattern 104, has been projected onto an image, and the projected reference light pattern appears in both the left image input patch P and the right image input patch Q.

A typical SAD matching calculation that may be used to generate a matching score for the input patches P and Q may be to minimize an error function $E_k$, such as $$E_k = \Sigma_{i,j=0}^{3} |P(i,j) - Q_k(i,j)|, \quad (1)$$

in which (i, j) is a pixel location within a patch, k is a patch identification ID:[1,192] corresponding to a patch of the reference light pattern. For this example, consider that the patch identification k relates to the reference light pattern 104, which has 192 unique patterns; hence, the patch identification ID:[1,192].

For the SAD approach of Eq. (1), the total computational burden to determine the error function $E_k$ for a single image input patch P with respect to a single image patch $Q_k$ involves 4×4×2×192=6144 addition operations.

In contrast to the approach of Eq. (1), FIG. 2B depicts an SAD direct-calculation technique according to the subject matter disclosed herein. In FIG. 2B, the patch on the left is a 4×4 input image patch P that includes the projected reference light pattern 104. The patch on the right is an example 4×4 binary reference patch $Q_k$, which is a binary representation of a 4×4 patch from the reference light pattern 104. Each of the pixels in the binary reference patch $Q_k$ that contains an "A" represents a binary "0" (i.e., black). Each of the pixels of the binary reference patch $Q_k$ that contains a "B" represents a binary "1" (i.e., white).

Using binary patterns, minimizing an error function may be reformulated into only summation operations of the pixels that are 1's in the reference patterns. According to one embodiment disclosed herein, a simplified SAD matching calculation that may be used to generate a matching score for the image input patch P with respect to a reference light pattern patch may be to minimize an error function $E_k$ as $$E_k = \sum_{i,j \in B_k} |P(i,j) - 1| + \sum_{i,j \in A_k} |P(i,j) - 0| \quad (2)$$

$$= \|B_k\|_0 - \sum_{i,j \in B_k} P(i,j) + \sum_{i,j \in A_k} P(i,j) \quad (3)$$

$$= \|B_k\|_0 + P_{sum} - 2 \sum_{i,j \in B_k} P(i,j), \quad (4)$$

in which (i, j) is a pixel location within the input patch P, k is a patch identification ID:[1,192] corresponding to a patch of the reference light pattern 104, $B_k$ is the set of pixels having a value of 1 in the reference patch $Q_k$, $\|B_k\|$ is the count of 1's in the reference patch $Q_k$, and $P_{sum}$ is the sum of all pixel values in patch P. As $\|B_k\|$ is known for each binary reference patch, and $P_{sum}$ may be pre-computed (and the average of 1's in a reference pixel pattern is 8), the number of additions required to do a single pattern-to-pattern comparison is reduced from 32 to approximately 8.

Thus, for the SAD approach according to Eq. (4), the total computational burden to determine the error function $E_k$ for a single image input patch P with respect to an image reference patch $Q_k$ involves 8×192 addition operations for an average $\|B_k\|$ of 8. To further reduce the number of computation operations, $P_{sum}$ may be precomputed.

Referring again to FIG. 2A, a typical Sum of Squared Difference (SSD) matching calculation that may be used to minimize an error function $E_k$ is $$E_k = \Sigma_{i,j=0}^3 |P(i,j) - Q_k(i,j)|^2, \quad (5)$$

in which (i, j) is a pixel location within a patch, k is a patch identification ID:[1,192] corresponding to a patch of the reference light pattern 104.

For the typicalSSD approach of Eq. (5), the total computation to determine the error function $E_k$ for a single image input patch P with respect to an image reference patch $Q_k$ involves 4×4×2×192=6144 addition operations.

Referring to FIG. 2B and in contrast to the typical SSD approach, an embodiment disclosed herein provides a simplified SSD matching calculation that may used minimizes an error function $E_k$ as $$E_k = \sum_{i,j \in B_k} [P(i,j) - 1]^2 + \sum_{i,j \in A_k} [P(i,j) - 0]^2 \quad (6)$$

$$= \|B_k\|_0 - \sum_{i,j \in B_k} P(i,j) + \sum_{All\, i,j} P^2(i,j) \quad (7)$$

$$= \|B_k\|_0 + P^2_{sum} - 2 \sum_{i,j \in B_k} P(i,j), \quad (8)$$

in which (i, j) is a pixel location within the input patch P, k is a patch identification ID:[1,192] corresponding to a patch of the reference light pattern 104, $B_k$ is a set of pixels having a value of 1 in the binary reference patch $Q_k$, $\|B_k\|$ is the count of 1's in the binary reference patch $Q_k$, and $P_{sum}$ is the sum of all pixel values in patch P.

For the simplified SSD approach according to Eq. (8), the total computational burden to determine the error function $E_k$ for a single image input patch P with respect to an image reference patch $Q_k$ involves approximately 8×192 addition operations for an average $\|B_k\|$ of 8. To further reduce the number of computation operations, both $\|B_k\|$ and $P^2_{sum}$ may be precomputed.

Referring again to FIG. 2A, a typical Normalized Cross-Correlation (NCC) matching calculation that may used minimizes an error function $E_k$ as $$E_k = \frac{\sum_{i,j=0}^3 P(i,j) \times Q_k(i,j)}{Q_{k\_sum}}, \quad (9)$$

in which (i, j) is a pixel location within a patch, k is a patch identification ID:[1,192] corresponding to a patch of the reference light pattern 104.

For the typicalNCC approach of Eq. (9), the total computational burden to determine the error function $E_k$ for a single image input patch P with respect to an image reference patch $Q_k$ involves 4×4×192 multiplication operations plus 4×4×192 addition operations, which equals 6144 operations.

Referring to FIG. 2B, in contrast to the corresponding typical NCC approach, one embodiment disclosed herein provides a simplified NCC matching calculation that minimizes an error function $E_k$ as $$E_k = \sum_{i,j \in B_k} P(i,j) \times 1 + \sum_{i,j \in A_k} P(i,j) \times 0 \quad (10)$$

$$= \frac{\sum_{i,j \in B_k} P(i,j)}{\|B_k\|_0}, \quad (11)$$

in which (i,j) is a pixel location within the input patch P, k is a patch identification ID:[1,192] corresponding to a patch of the reference light pattern 104, and $\|B_k\|$ is the sum of white patches in binary reference patch Q.

It should be noted that the simplified NCC technique disclosed herein generally uses one division operation for normalization. As $\|B_k\|$ may take five different integer values (specifically, 6-10), the division operation may be delayed until comparing matching scores. Accordingly, the 192 matching scores may be divided into five groups based on their $\|B_k\|$ values, and the highest matching score may be found among group. It is only when the highest scores among each of the five groups are compared that the division needs to be performed, which only needs to be done five times. Thus, for the NCC approach according to Eq. (11), the total computational burden to determine the error function $E_k$ for a single image input patch P with respect to an image reference patch $Q_k$ involves 5 multiplication operations plus 2×192 addition operations, which equals a total of 389 operations. Similar to the SAD and the SSD approaches disclosed herein, $P^2_{sum}$ may be precomputed.

Figure 3:
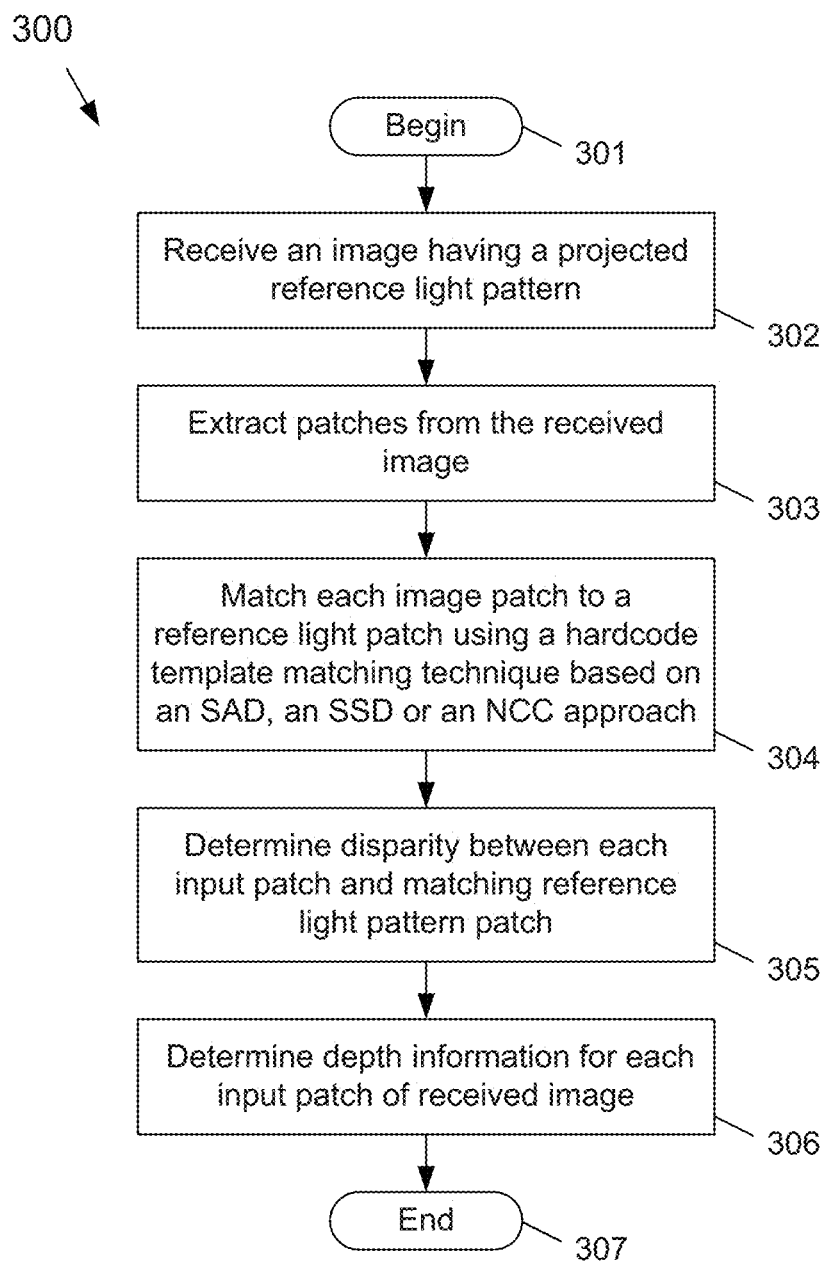
FIG. 3 depicts a flow diagram of a process for determining depth information using a hardcode template matching technique according to the subject matter disclosed herein.

FIG. 3 depicts a flow diagram of a process 300 for determining depth information using a hardcode template matching technique according to the subject matter disclosed herein. At 301, the process begins. At 302, an image having a projected reference light pattern is received. In one embodiment, the projected reference light pattern may be the reference light pattern 104. At 303, patches are extracted from the received image. At 304, each image patch is matched to a reference light pattern patch using the simplified SAD, the SSD or the NCC techniques disclosed herein. At 305, the disparity between each image patch and the matching reference light pattern patch may be determined. At 306, depth information for each image patch may be determined. At 307, the process ends.

Figure 4:
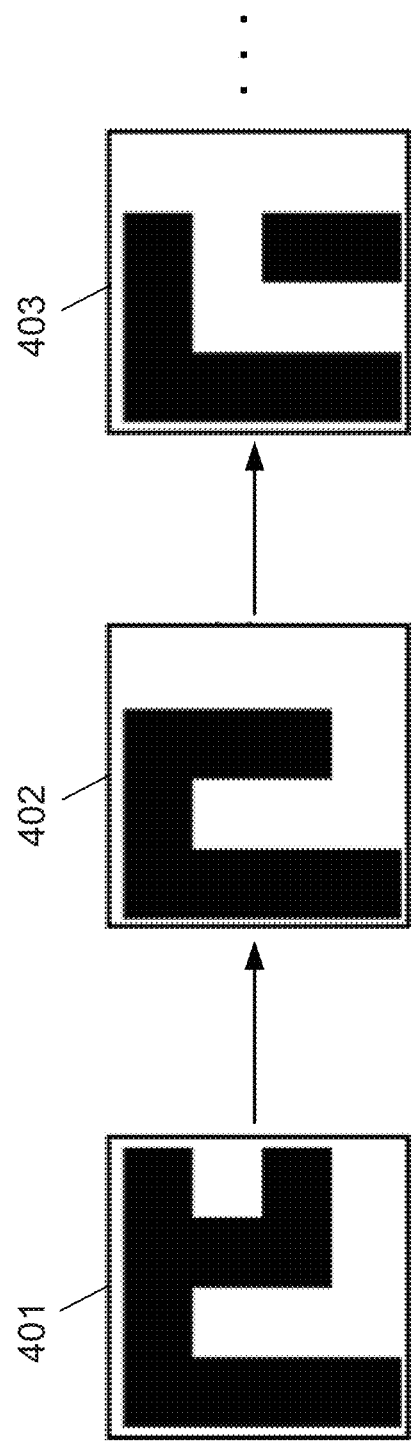
FIG. 4 depicts a sequence of reference light pattern patches that are incrementally analyzed according to the subject matter disclosed herein.

The number of operations for each of the three simplified direct computation matching techniques disclosed herein may be further reduced by incrementally computing the term $\Sigma_{i,j \in B_k} P(i,j)$ from one reference patch to the next. For example, if the term $\Sigma_{i,j \in B_k} P(i,j)$ is incrementally computed for the reference patch 401 depicted in FIG. 4, the computation for the term $\Sigma_{i,j \in B_k} P(i,j)$ for the reference patch 402 adds only two addition operations. Thus, by incrementally computing the term $\Sigma_{i,j \in B_k} P(i,j)$ from one reference patch to the next, the number of operations may be significantly reduced.

In particular, the reference patch 401 includes six is (i.e., six white pixels). The reference patch 402 includes eight is (e.g., eight white pixel). The difference between in the number of is between the reference patch 401 and the reference patch 402 is two, so the value for the number of is in the reference patch 402 is two more than the value for the number of is in the reference patch 401. When the reference patch 403 is considered, no additional addition operations are added because both the reference patch 402 and the reference patch 403 include eight is. On average, the incremental number of addition operations is 2. Thus, using this incremental approach, the total number of addition operations that are needed to match all unique patterns is reduced to 2×192, which for the simplified SAD technique disclosed herein results in being 16 times faster than the SAD technique of Eq. (5).

The disparity between an image input patch and a matching reference patch determined based on any of Eqs. (4), (8) or (11) may be used by the processing device 103 to generate depth information for a depth map 107.

2. Pattern Correlation based on Probability.

To generate estimated depth information based on a probability that an image input patch matches a reference light pattern patch, such as the reference light pattern 104, a pattern correlation based on Bayes' rule may be used. That is, Bayes' rule may be used to determine the probability that an image input patch belongs to a particular class c of reference light pattern patches. Equation (12) below provides a simplified way to estimate the probability P of a 4×4 tile T (or patch) belongs to a class c.

$$\log(P(c|T)) = \log(\pi P(t|c)) = \Sigma \log(P(t|c)) \quad (12)$$

in which t is a pixel of value 1.

Rather than performing multiplications, as indicated by the middle term of Eq. (12), the probability that an image input patch belongs to a particular class c of reference light pattern patches may be determined by only using addition operations, as indicated by the rightmost term of Eq. (12). Thus, the probability P(c|T) may be represented by a sum of probabilities instead of a multiplication of probabilities. For 192 unique patterns of size 4×4 pixels, t may take a value of [0,15] and c may take a value of [1,192]. A 16×192 matrix M may be formed in which each entry represents the log (P(t|c)). When an image input patch is to be classified, it may be correlated with each column of the matrix to obtain the probability log (P(t|c)) for each class. The class having the highest probability will correspond to the final matched class. The entries of the matrix M may be learned from a dataset formed from structured-light images in which the depth value of each reference pixel is known. Alternatively, the matrix M may be formed by a linear optimization technique or by a neural network. The performance of the Pattern Correlation approach is based on how well the matrix M may be learned.

Figure 5:
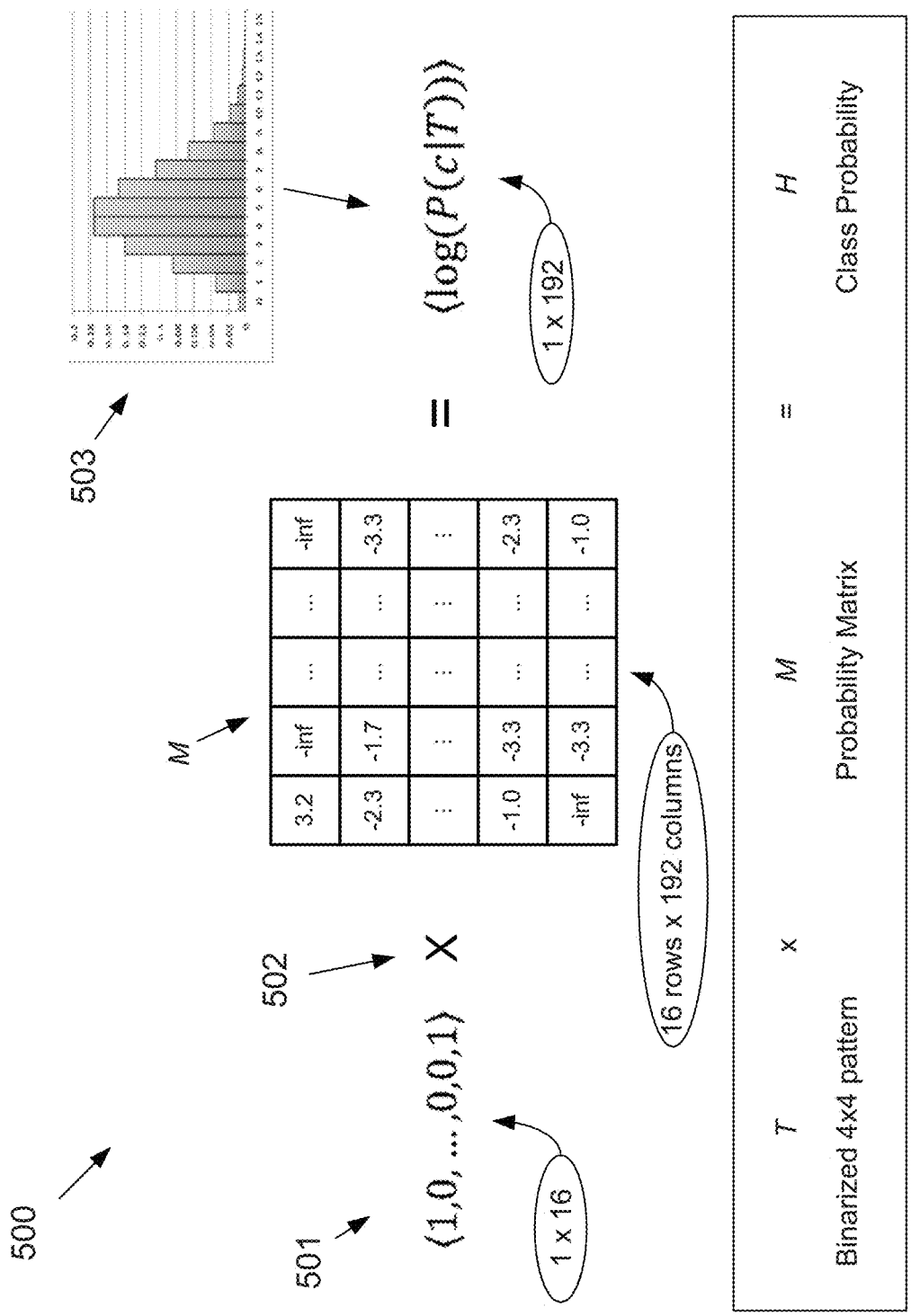
FIG. 5 pictorially depicts an example process for estimating depth information based on a probability that an image input patch belongs to a particular class c of reference light pattern patches according to the subject matter disclosed herein.

FIG. 5 pictorially depicts an example process 500 for estimating depth information based on a probability that an image input patch belongs to a particular class c of reference light pattern patches according to the subject matter disclosed herein. At 501, the image input patch is binarized to 0 and 1, which may be done by normalizing T and thresholding by 0.5 to form elements [0,1]. The binarized input patch is then arranged as a 1×16 vector. The vector T and the matrix M are multiplied at 502 to form a 1×192 element histogram H at 503 representing the probabilities that the input patch is a particular reference light pattern patch.

The disparity between an image input patch and a matching reference patch determined by using the approach depicted in FIG. 5 may be used by the processing device 103 to generate depth information for a depth map 107.

3. Pattern Classification by Lookup Table.

The estimated depth information generated by the processing device 103 may also be generated by using a lookup table (LUT) to classify an image input patch as belonging to a particular class c. That is, an LUT may be generated that contains probability information that an image patch belongs to particular class c of patches of a reference light pattern.

In one embodiment, an LUT may have $2^{16}$ keys to account for all possible 4×4 binarized input patterns. One technique for generating a value corresponding to each key is based on the probability that an image input patch belongs to a class c, as described in connection with FIG. 5.

Figure 6:
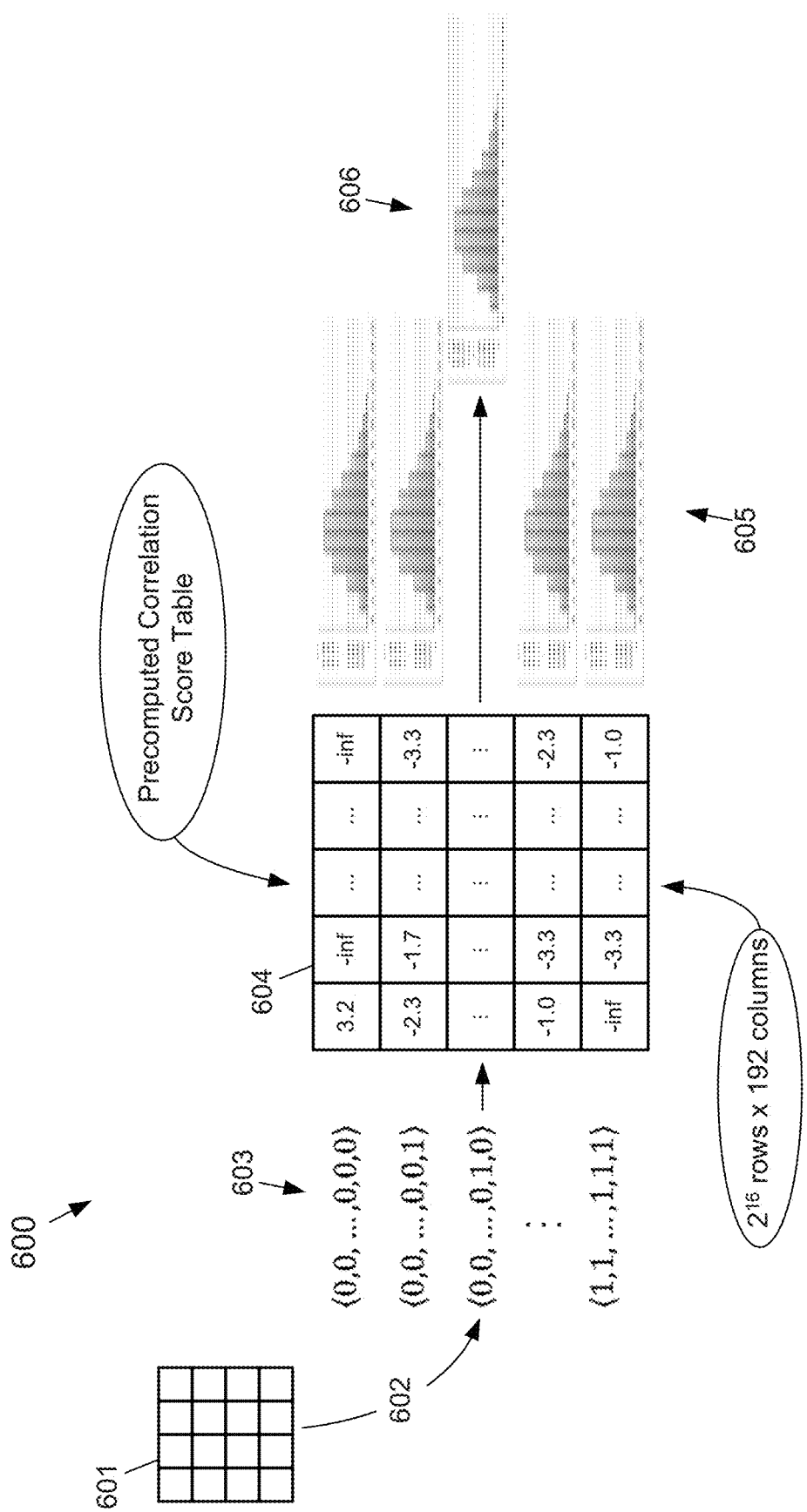
FIG. 6 is a pictorial depiction of an example process that uses a lookup table for generating the probability that an image input patch belongs to a class c according to the subject matter disclosed herein.

FIG. 6 is a pictorial depiction of an example process 600 that uses an LUT for generating the probability that an image input patch belongs to a class c according to the subject matter disclosed herein. In FIG. 6, a 4×4 image input patch 601 is binarized and vectorized at 602 to form a key 603 to a precomputed correlation score table 604. Each row of the table 604 contains the values of a histogram 605 of the probability that an image input patch belongs to a class c. In the example depicted in FIG. 6, the image input patch 601 has been binarized and vectorized to form an example key (0, 0, . . . , 0, 1, 0). The histogram 605 for this example key is indicated at 606. For the example depicted in FIG. 6, the total number of locations in the LUT 604 is $2^{16}$ rows×192 columns=12 MB locations.

In an embodiment in which an image input patch is large, an LUT corresponding to the LUT 604 in FIG. 6 may become prohibitively large for a handheld device, such as a smartphone. If, for example, the image input patch is an 8×8 input patch, an LUT corresponding to the LUT 604 may include $8.7^{12}$ GB locations. To avoid an LUT having such a large size, a large image input patch may be divided into smaller patches, such as 4×4 sub-patches, that are used as keys to an LUT that corresponds to the LUT 604. Division of the input patch may be done to provide separate and distinct sub-patches or by using a sliding-window.

Figure 7:
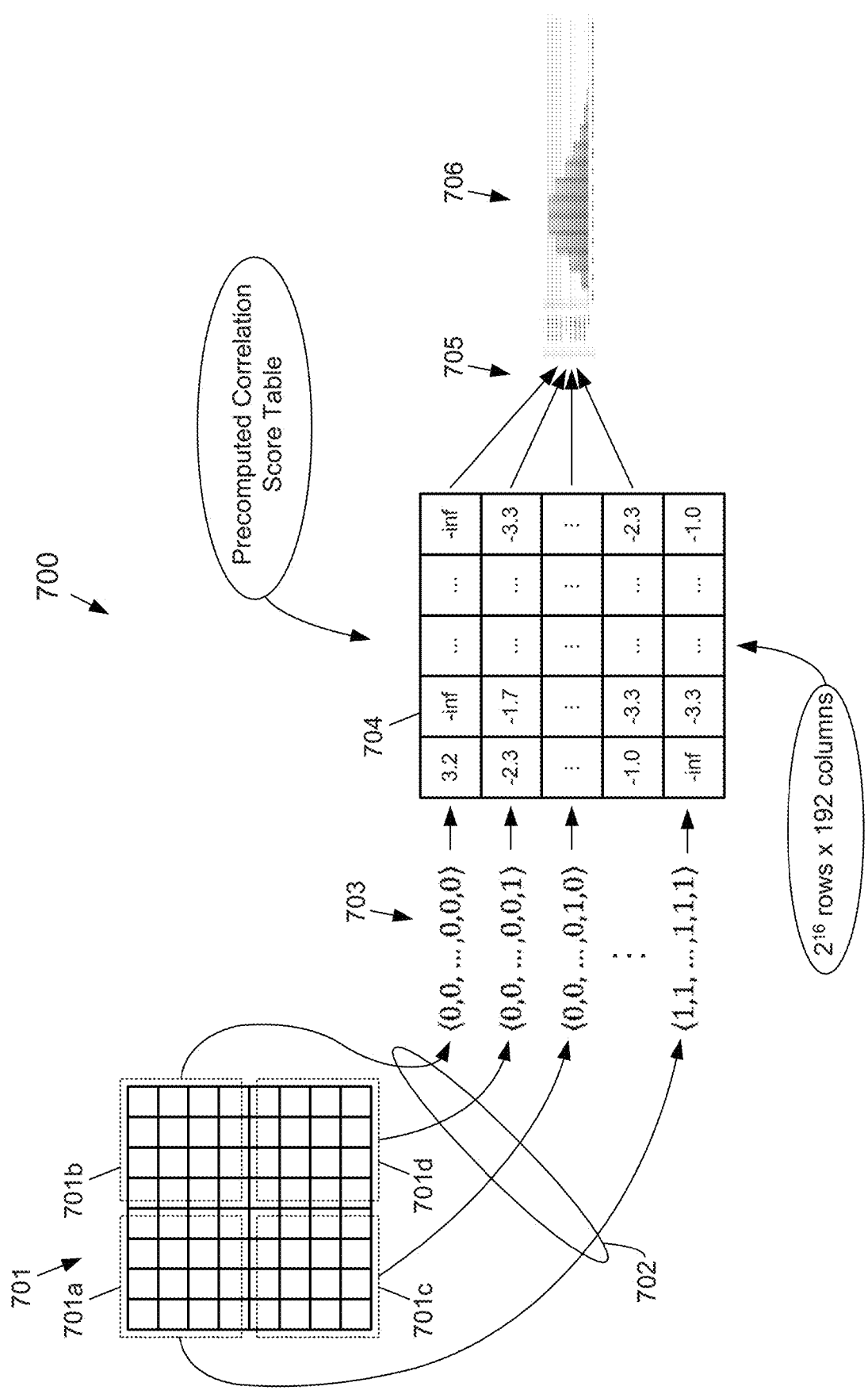
FIG. 7 is a pictorial depiction of an example process that distinctly subdivides a large image input patch and uses a lookup table for generating the probability that an image input sub-patch belongs to a class c according to the subject matter disclosed herein.

FIG. 7 is a pictorial depiction of an example process 700 that distinctly subdivides a large image input patch and uses an LUT for generating the probability that an image input sub-patch belongs to a class c according to the subject matter disclosed herein. In FIG. 7, an 8×8 image input patch 701 is subdivided into four sub-patches 701*a*-701*d*. The four sub-patches are each binarized and vectorized at 702 to respectively form separate example keys 703 to a precomputed correlation score table 704. Each row of the table 704 contains the values of a histogram of the probability that an image input sub-patch belongs to a class c. In the example depicted in FIG. 7, the image input sub-patches 701a-701d have each been binarized and vectorized to form separate keys. A voting process may be used at 705 to determine the particular probability histogram 706 for the 8×8 image input patch 701. The voting process may, for example, select the probability histogram that receives the most votes. For the example depicted in FIG. 7, the total number of locations in the LUT 704 would be $2^{16}$ rows×192 columns=12 MB locations. If, for example, a sliding-window process is alternatively used to subdivide a large image input patch, the process 700 would basically operate in the same way.

Figure 8:
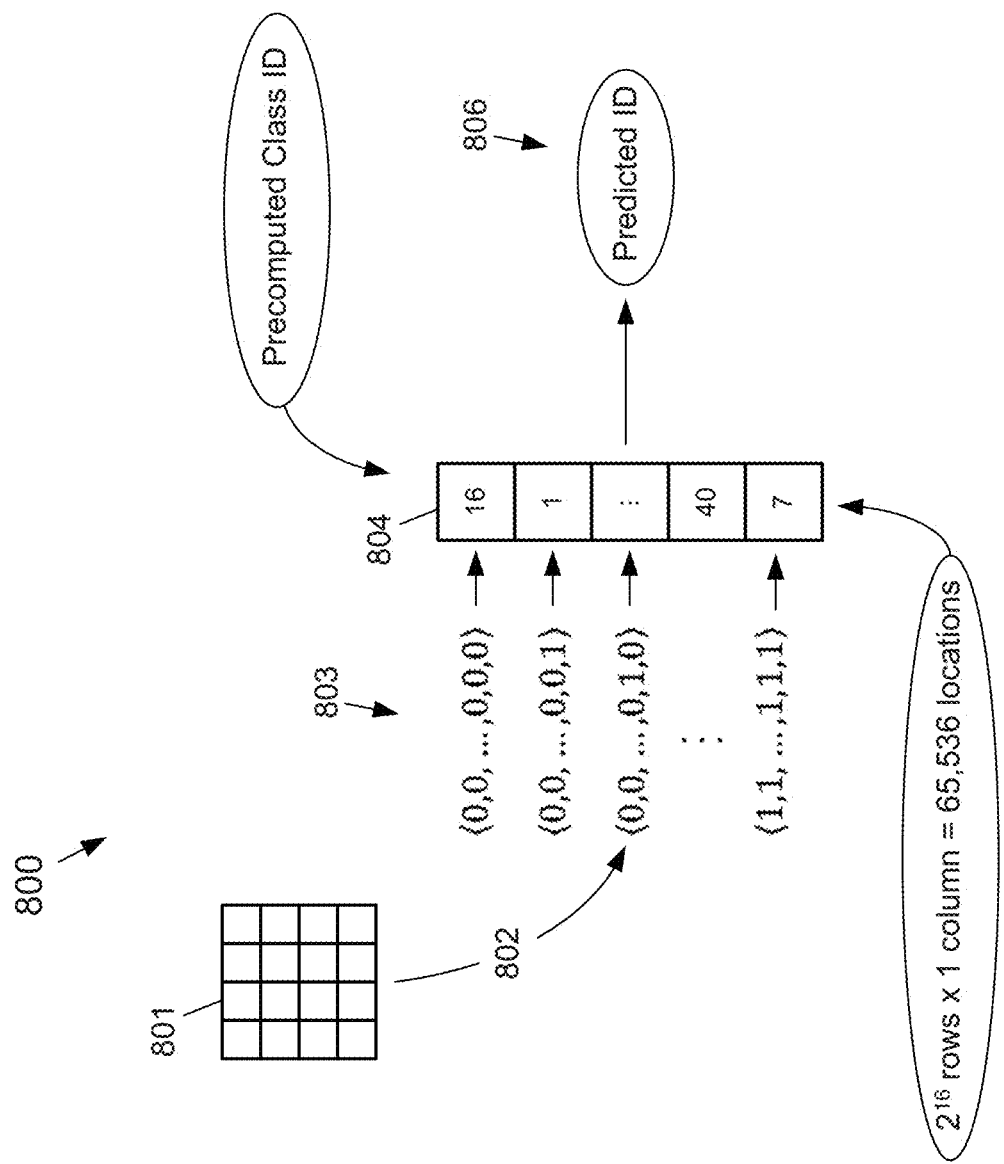
FIG. 8 is a pictorial depiction of an example process uses a lookup table that contains only a precomputed class identification that may be used for determining that an image input patch belongs to a class c according to the subject matter disclosed herein.

The overall size of the LUT may be further reduced by replacing the LUT 604 (or the LUT 704) with an LUT that contains precomputed class identifications. FIG. 8 is a pictorial depiction of an example process 800 uses an LUT that contains only a precomputed class identification (ID) that may be used for determining that an image input patch belongs to a class c according to the subject matter disclosed herein. In FIG. 8, a 4×4 image input patch 801 is binarized and vectorized at 802 to form a key 803 to a precomputed class ID table 804. Each row of the table 804 contains a precomputed class ID for an image input sub-patch. In the example depicted in FIG. 8, the image input patch 801 has been binarized and vectorized at 802 to form the example key⟨0, 0, . . . , 0, 1, 0⟩. The predicted class ID for this example key is indicated at 806. For the example depicted in FIG. 8, the total number of locations in the LUT 904 would be $2^{16}$ rows×1 column=65,536 locations.

Figure 9:
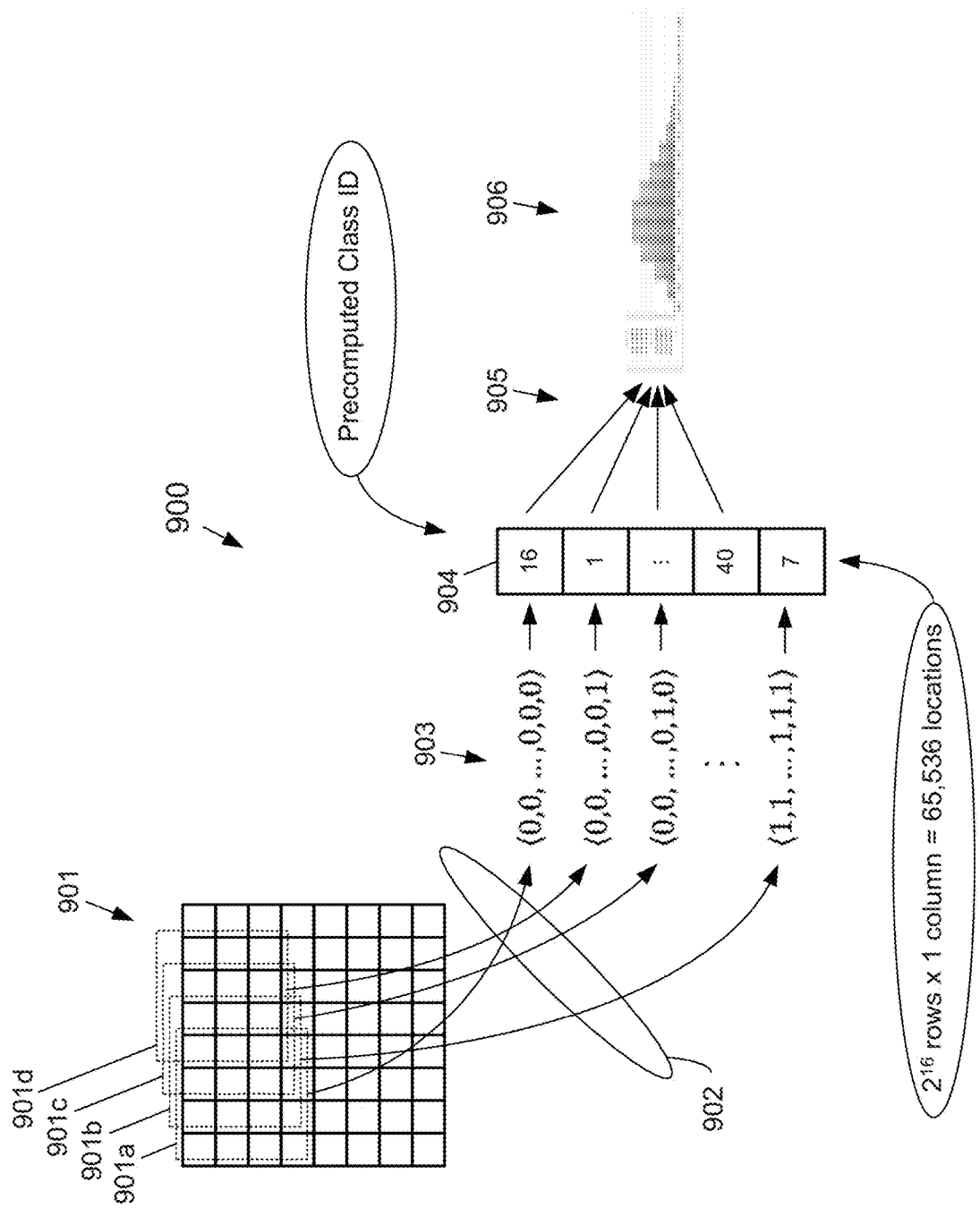
FIG. 9 is a pictorial depiction of an example process that subdivides a large image input patch using a sliding window and uses a lookup table that contains precomputed class identifications according to the subject matter disclosed herein.

FIG. 9 is a pictorial depiction of an example process 900 that subdivides a large image input patch using a sliding window and uses an LUT that contains precomputed class identifications according to the subject matter disclosed herein. In FIG. 9, an 8×8 image input patch 901 is subdivided into 64-4×4 sub-patches, of which only sub-patches 901a-901d are depicted. The sub-patches are each binarized and vectorized at 902 to respectively form separate keys 903 to a precomputed class ID table 904. A 64-input voting process at 905 may be used to generate a probability histogram 906 for the 8×8 image input patch 901. For the example depicted in FIG. 9, the total number of locations in the LUT 1004 would be $2^{16}$ rows×1 column=65,536 locations.

Figure 10:
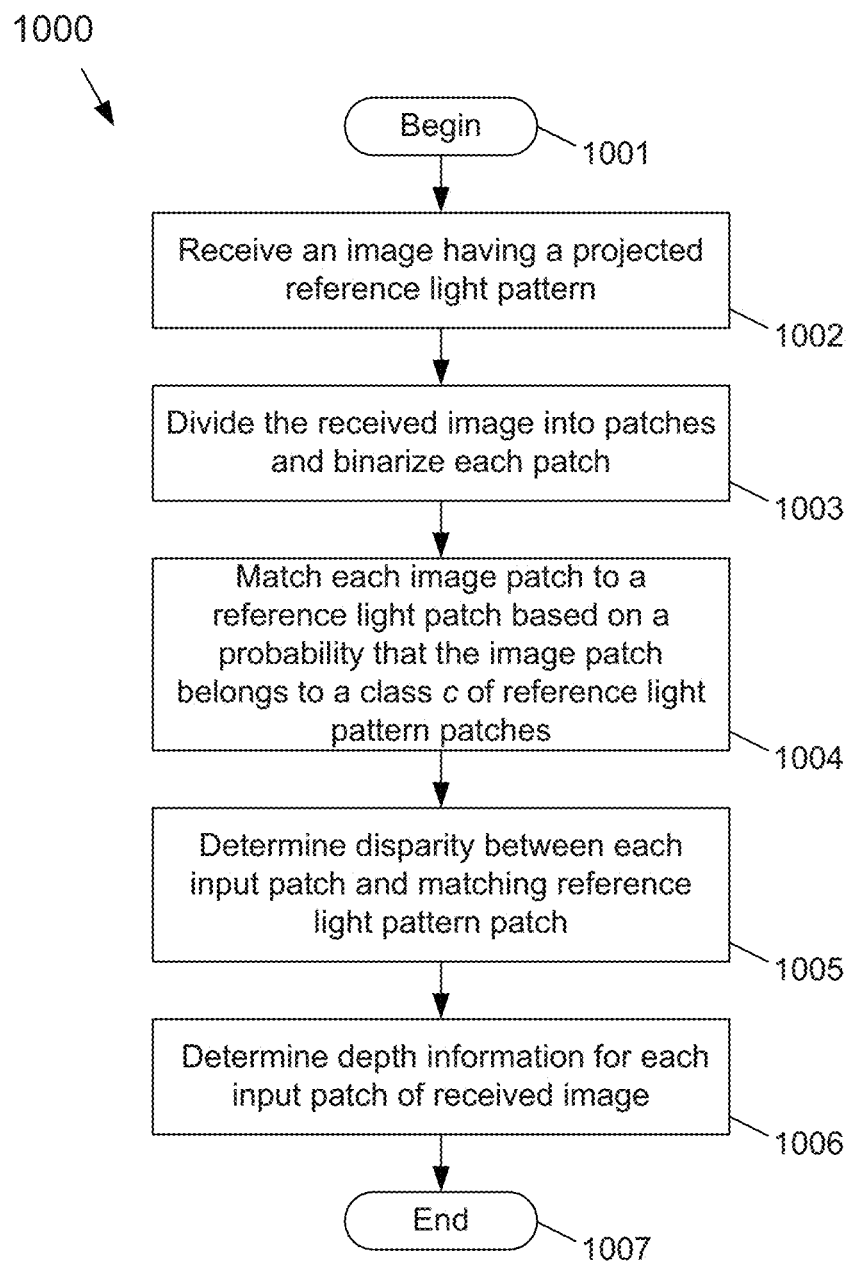
FIG. 10 a flow diagram of a process for determining depth information based on a probability that an image input patch matches a reference light pattern patch according to the subject matter disclosed herein.

FIG. 10 a flow diagram of a process 1000 for determining depth information based on a probability that an image input patch matches a reference light pattern patch according to the subject matter disclosed herein. At 1001, the process begins. At 1002, an image having a projected reference light pattern is received. In one embodiment, the projected reference light pattern may be the reference light pattern 104. At 1003, the received image is divided into patches, and each patch is binarized. At 1004, each image patch is matched to a reference light pattern patch based on a probability that the image input belongs to a particular class c of reference light pattern patches. In one embodiment, the matching may be done using a probability matrix M to form a histogram H representing the probabilities that the input patch is a particular reference light pattern patch, such as the process depicted in FIG. 5. In another embodiment, the matching may be done using an LUT for generating the probability that an image input patch belongs to a class c. The LUT may be embodied as a precomputed correlation score table in which each row of the LUT contains the values of a histogram of the probability that an image input patch belongs to a class c, such as the process depicted in FIG. 6. In still another embodiment, the determination that an image input patch belongs to a class c may involve a voting process, such as the process depicted in FIG. 7 or 9. In yet another embodiment, the LUT may be embodied as a precomputed class ID table, such as depicted in FIG. 8 or 9.

At 1005, the disparity between each image patch and the matching reference light pattern patch may be determined. At 1006, depth information for each image patch may be determined. At 1007, the process ends.

Table 1 sets forth a few quantitative comparisons between a typical stereo-matching approach and the matching approaches disclosed herein. The computational complexity of a typical stereo-matching approach may be represented by O(P*S), in which P is the patch size and S is the search size. The speed of a typical stereo-matching approach is taken as a base line 1×, and the amount of memory needed is 2 MB.

TABLE 1

Quantitative Comparisons

| Approaches | | Speed | Memory |
|---|---|---|---|
| Typical Stereo-Matching | O(P * S) | 1× | 2 MB |
| Hardcoding | O(P) | 16× | 0 |
| Correlation | O(P) | 4× | 3 kB |
| LUT | O(P) | 32× | 12 MB |
| LUT + Voting | O(1) | >1000× | 64 KB |

The computational complexity of the matching approaches disclosed herein is much simpler and are much faster than a typical matching approach. The amount of memory the matching approaches disclosed herein may use may be significantly smaller than the amount of memory a typical matching approach uses, depending on which approach is used.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A method for a structured-light system to estimate depth in an image, the method comprising:
   receiving the image, the image being of a scene onto which a reference light pattern has been projected, the image including a projection of the reference light pattern, and the reference light pattern comprising a predetermined number of particular sub-patterns;
   binarizing at least one patch of the image, the patch comprising a predetermined number of pixels;
   matching the at least one patch to a sub-pattern of the reference light pattern by minimizing an error function $E_k$ for the patch based on a first number of ones in the binarized patch and a count of white patches in the reference light pattern and a square of a count of black patches in the reference light pattern; and
   determining an estimate of depth for at least one patch of the image based on a disparity between the patch and the sub-pattern.

2. The method of claim 1, wherein the second number of ones in each respective binarized sub-pattern is determined by incrementing the second number of ones for a first binarized sub-pattern by 2 to obtain the second number of ones for a subsequent binarized sub-pattern.

3. The method of claim 1, wherein the error function $E_k$ is further based on a white pixel subset of the reference light pattern and a black pixel subset of the reference light pattern.

4. A method for a structured-light system to estimate depth in an image, the method comprising:
   receiving the image, the image being of a scene onto which a reference light pattern has been projected, the image including a projection of the reference light pattern, and the reference light pattern comprising a predetermined number of particular sub-patterns;
   binarizing at least one patch of the image, the patch comprising a predetermined number of pixels;
   matching the at least one patch to a sub-pattern of the reference light pattern by minimizing an error function $E_k$ for the patch based on a first number of ones in the binarized patch and a count of black patches divided by a count of white patches in a binary reference patch; and
   determining an estimate of depth for at least one patch of the image based on a disparity between the patch and the sub-pattern.

5. The method of claim 4, wherein the second number of ones in each respective binarized sub-pattern is determined by incrementing the second number of ones for a first binarized sub-pattern by 2 to obtain the second number of ones for a subsequent binarized sub-pattern.

6. The method of claim 4, wherein the error function $E_k$ is further based on a white pixel subset of the reference light pattern and a black pixel subset of the reference light pattern.

\* \* \* \* \*